J. J. BATE.
Refrigerator.

No. 222,121.                    Patented Dec. 2, 1879.

Witnesses:
Henry Eichling
H. Wells Jr.

Inventor:
John Jones Bate
per James A. Whitney
Atty.

UNITED STATES PATENT OFFICE.

JOHN J. BATE, OF BROOKLYN, NEW YORK.

IMPROVEMENT IN REFRIGERATORS.

Specification forming part of Letters Patent No. 222,121, dated December 2, 1879; application filed July 19, 1877.

*To all whom it may concern:*

Be it known that I, JOHN JONES BATE, of the city of Brooklyn, in the county of Kings and State of New York, have invented certain Improvements in Refrigerators, of which the following is a specification.

This invention relates to that class of refrigerators in which a forced circulation of air is maintained within a chamber closed against access of external air; and said invention comprises certain novel combinations of parts, whereby provision is made for the more complete refrigeration of the circulated air and for the more thorough distribution of such circulated air to all parts of the herein-specified closed chamber.

Figure 1:
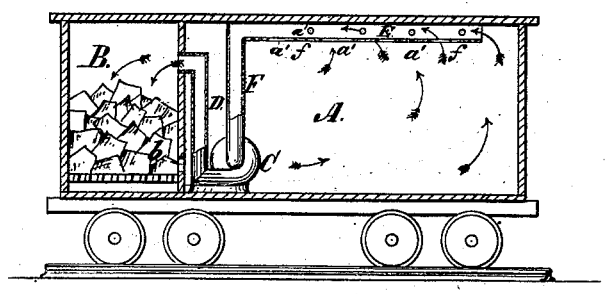
Figure 2:
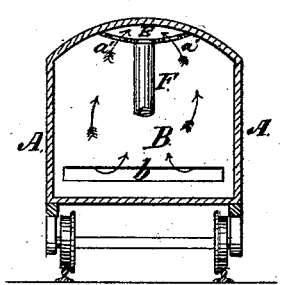
Figure 3:
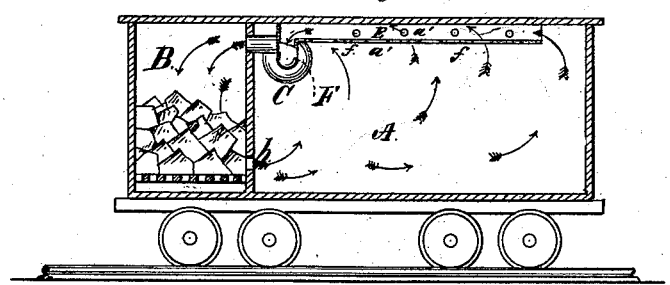

Figure 1 is a longitudinal sectional view of a refrigerator-car embracing my said invention. Fig. 2 is a transverse sectional view of the same, and Fig. 3 is a longitudinal sectional view of such a car, embracing certain features of my said invention.

A is the refrigerating-chamber, constituted by either the body of a refrigerating-car or by a fixed building, said chamber being fitted with suitable means of ingress and egress, but when in use closed against access of the external atmosphere, in order that its contained air may be circulated over and over through the ice-box to cool and dry the same. B is the ice-box, preferably placed at one end of the car, and, preferably, with a grating, *a*, at the bottom, to sustain the ice and permit the water resulting from the melting of the ice to flow away out of contact with the latter, such water being finally conducted away through a goose-neck or inverted siphon in the ordinary manner.

At the lower part of the ice-box, and consequently near the floor of the chamber A, is a long and narrow opening, *b*, extending nearly or quite the entire width of the ice-box and of the chamber A, the object of this being to insure (in the operation of the apparatus) the flow of the air from the ice-box in a broad sheet into the lower portion of the refrigerating-chamber A across the entire area thereof, thereby securing the refrigerating action of the air in all parts of the said chamber as the air rises therein, as hereinafter more fully explained.

C is the fan-blower, which, in the more perfect form of the apparatus, is placed at the bottom of the chamber A, with its outlet connected by a pipe, D, with the upper part of the ice-box, as represented in Fig. 1. By placing the fan-blower on the bottom of the chamber A greater stability is secured in the operation of the fan-blower when the apparatus is embraced or embodied in a refrigerator car, steamer, or is in any other manner made movable.

E is a circulating-chamber, extending longitudinally along the ceiling of the chamber A, the said circulating-chamber having perforations *a'* formed in its walls *f*. When the apparatus is constructed as shown in Figs. 1 and 2 this chamber E is connected with the inlet of the fan-blower by a vertical pipe, F. When constructed as shown in Fig. 3 the connection is made much shorter, as also indicated by the reference-letter F.

In the operation of the apparatus the fan-blower is rotated to draw air from the chamber A upward into the circulating-chamber E through the perforations *a'* in the wall *f* of the latter, and thence through the fan into the upper part of the ice-box B, thence downward through the ice contained in such ice-box, and outward through the long opening *b*. The forcible propulsion of the air into the ice-box B causes it to come in close contact with the ice in the latter while passing down through said ice-box, thereby cooling the air and condensing the moisture therefrom. The cooled or refrigerated air issuing from the ice-box through the long opening *b* is projected in a broad sheet along nearly or quite the entire horizontal area of the lower part of the chamber A, displacing the air above it which passes through the perforations *a'* in the walls *f* of the circulating-chamber E, and is then forced into the top of the ice-box B, as just described, so that by this means a continual circulation of the air within the closed chamber A is maintained, the peculiar arrangement of the parts herein described causing the cooled or refrigerated air to be distributed or circulated throughout all parts of the chamber A, and enabling the capacity of the latter to be utilized to the utmost.

What I claim as my invention is—

1. The fan-blower C, arranged upon the floor of the refrigerating-chamber A, in combination with the pipes F and D, the ice-box B, and the circulating-chamber provided at the top of the refrigerating-chamber A, all substantially as and for the purpose herein set forth.

2. In a refrigerating apparatus, the combination, with, first, the closed refrigerating-chamber, and, second, an ice-box communicating with said chamber at the bottom, of, third, a fan-blower having its outlet opening into the upper part of the ice-box, and, fourth, a perforated circulating-chamber arranged at the upper part of the refrigerating-chamber, and having its interior connected with the inlet-opening of the fan, substantially as described.

JOHN J. BATE.

Witnesses:
EDWARD HOLLY,
H. WELLS, Jr.